United States Patent [19]

Veltman et al.

[11] 4,395,070

[45] Jul. 26, 1983

[54] HOLD OPEN APPARATUS

[76] Inventors: Jan S. Veltman, 6747 Norwood Ave., Allen Park, Mich. 48101; Edward A. Ferrari, 809 E. Seven Mile, Detroit, Mich. 48203

[21] Appl. No.: 234,615

[22] Filed: Feb. 17, 1981

[51] Int. Cl.³ .............................................. B62D 25/00
[52] U.S. Cl. ................................................ 296/1 C
[58] Field of Search .................... 296/1 C; 299/338

[56] References Cited

U.S. PATENT DOCUMENTS

| 3,905,637 | 9/1975 | Smith | 296/1 C |
| 4,172,611 | 10/1979 | Krus | 296/1 C |
| 4,236,746 | 12/1980 | La Voie | 296/1 C |
| 4,257,642 | 3/1981 | Sampson | 296/1 C |
| 4,270,784 | 6/1981 | Vanover | 296/1 C |

Primary Examiner—Richard A. Bertsch
Attorney, Agent, or Firm—Irving M. Weiner; Pamela S. Burt; John L. Shortley

[57] ABSTRACT

A device for holding a vehicle license plate fuel opening cover or the like open during fueling. The device comprises a rod which springs into action when the plate is swung open, and retains the plate in open position through engagement with the plate frame or vehicle body. The rod can easily be swung to an inactive position to permit the plate to swing to a closed position.

9 Claims, 15 Drawing Figures

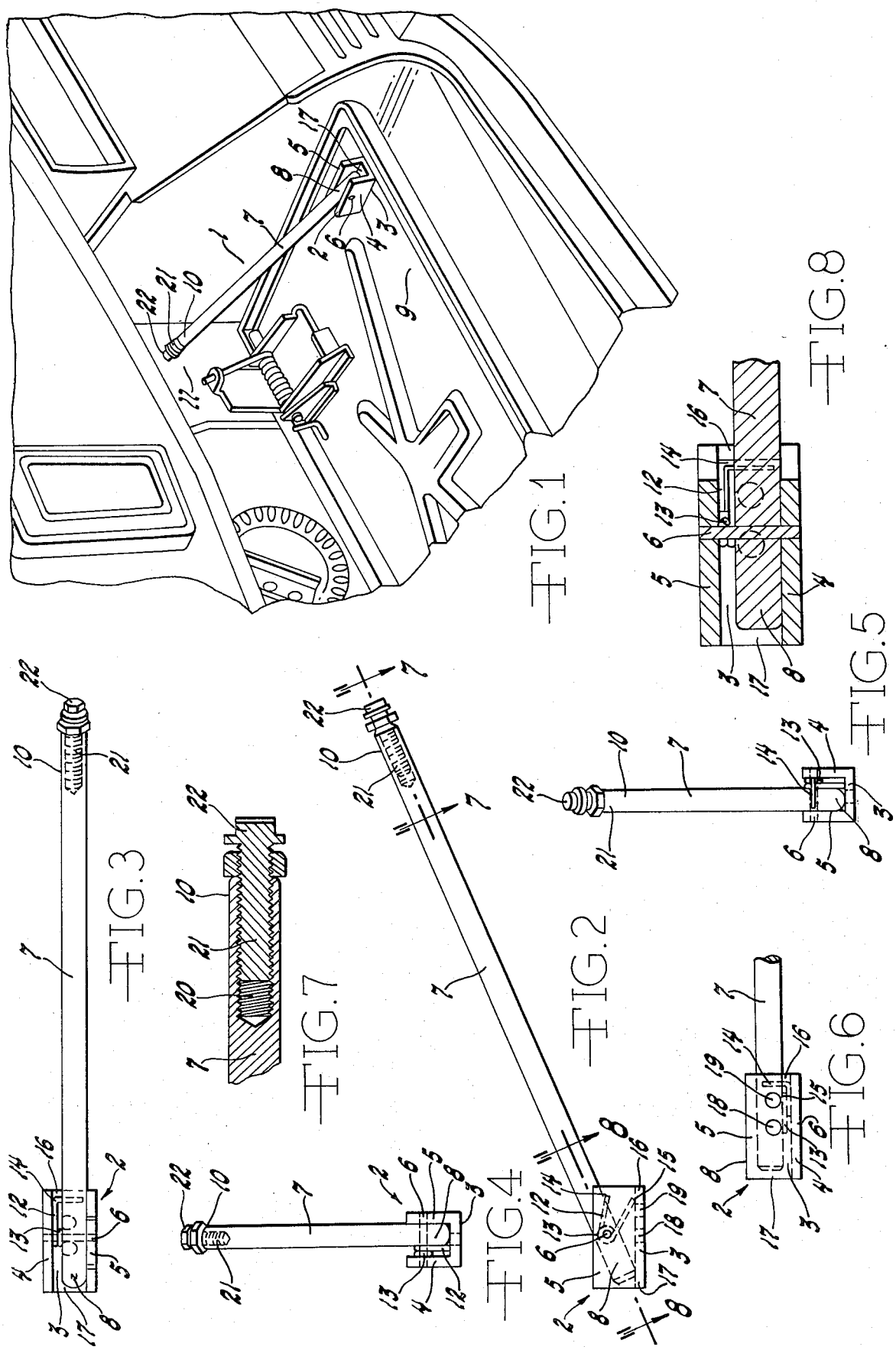

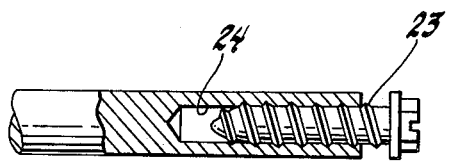
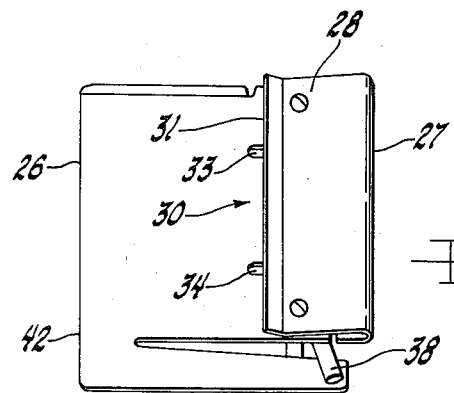
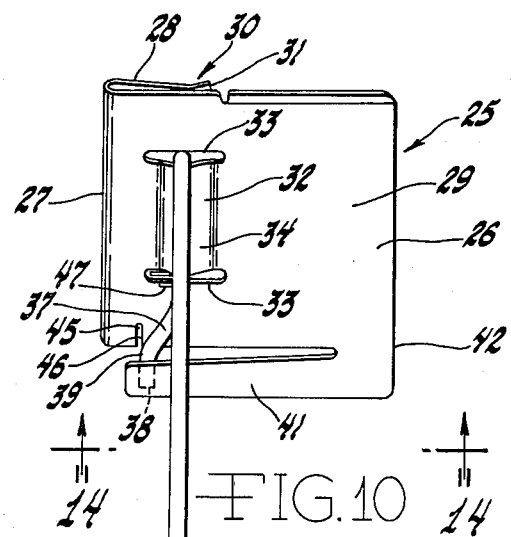
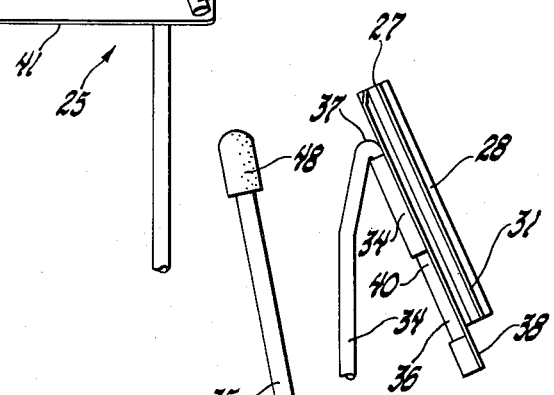
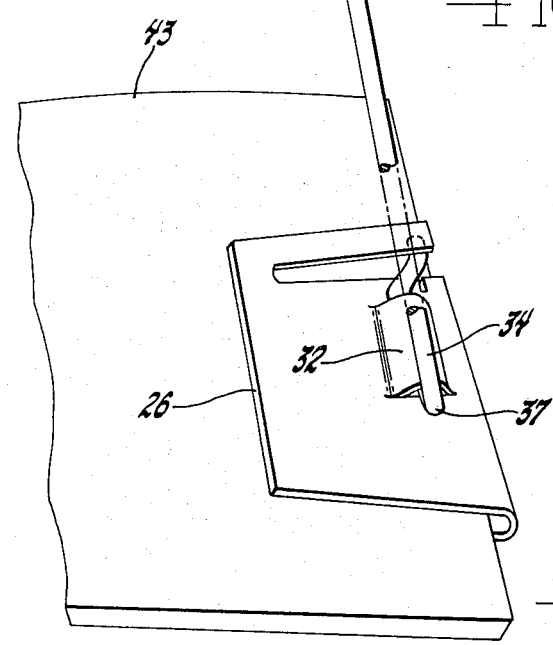
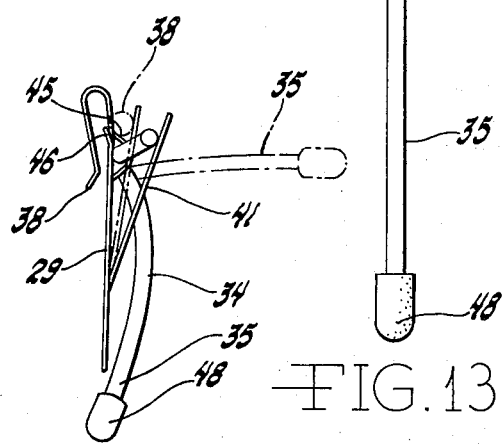

HOLD OPEN APPARATUS

BACKGROUND OF THE INVENTION

1. Field of the Invention

The present invention relates generally to a hold open apparatus which permits a member which is biased in a normally closed position to be held in an open position.

More particularly, the hold open apparatus in accordance with the present invention provides a spring-biased, pivotally mounted rod, which when mounted on a movable external member, automatically engages an opposing stationary member to hold the movable external member in spaced apart relation to the stationary member.

2. Description of the Prior Art

There is known a general type of hold open apparatus which employs a pivotally mounted license plate supporting frame. A frame member is secured to the vehicle, and a license plate-engaging frame member is pivotally mounted to the frame member secured to the vehicle.

One of the most serious disadvantages attendant known hold open apparatus is that they are not suitable for use on vehicles having a frame such as a license plate frame with a compression spring which exerts a force to return the frame to a vertical position. This is particularly noticeable on vehicles in which a depression is formed in the vehicle body to receive the license plate and in which access to the fuel filler pipe is gained by pivoting the license plate frame.

The hold open apparatus described hereinabove has had little or no success in eliminating the aforesaid disadvantages attendant hold open apparatuses, and there has developed a desideratum for a hold open apparatus for a vehicle which will, when the license plate frame of a vehicle is lowered, automatically hold the frame in a lowered position to allow access to the fuel filler pipe.

The following disclosures are illustrative of known license plate holder apparatuses.

U.S. Pat. No. 1,573,113, issued in 1926 to Irie, entitled "AUTOMOBILE LICENCE PLATE HOLDER", discloses a license plate holder composed of a main frame member and an auxiliary frame member centrally disposed beneath the main frame member. The auxiliary frame member has a plate integrally formed therein on which is inscribed the word "Out" or another suitable word which signifies that the rightful driver of the vehicle is not in the vehicle. The plate in the auxiliary frame is covered by a detachable, collapsible auxiliary license plate when the vehicle is used. When the driver leaves the vehicle, the hinged auxiliary frame is opened and the auxiliary plate is removed, uncovering the word inscribed on the plate.

U.S. Pat. No. 2,677,206, issued in 1954 to Paolini et al, entitled "AUTO TAG HOLDER HINGE", discloses a license plate holder comprised of two elongated C-shaped members. The member to which the license plate is mounted is slightly larger than the member which is mounted on the vehicle, the forward extending legs of the smaller member fitting within the rearward extending legs of the larger member. A rivet or bolt passes through the C-shaped members where the legs abut, allowing the larger member to pivot on the smaller member. An elongated, flat metal element centrally disposed on the large C-shaped member extends perpendicularly upward from the member to support the license plate.

The aforesaid specifically disclosed arrangements, however, have individually and collectively failed to provide any solution to the above-discussed shortcomings and disadvantages attendant hold open apparatus of the conventional type.

The present invention provides an effective solution to the aforesaid problems attendant known hold open apparatus by providing a spring-biased rod pivotally-mounted within or on a bracket, or a substantially rectangular enclosure, which can be mounted on a vehicle license plate frame or other movable external member. When the external member is lowered or otherwise "opened", the spring-biased rod is elevated from a position substantially parallel to the enclosure to engage an opposing stationary member, thereby holding the movable external member in spaced apart relation to the stationary member.

SUMMARY OF THE INVENTION

The present invention provides a hold open apparatus, the apparatus including a substantially rectangular enclosure and a spring-biased rod pivotally mounted therein.

It is an object of the present invention to provide a hold open device wherein the enclosure is defined by a base portion and spaced apart upwardly-extending side wall portions extending integrally from and substantially perpendicularly to said base portion. An elongated rod is pivotally mounted within said enclosure, and means are provided for elevating the rod from a position substantially parallel to the base portion to a position forming a predetermined angle with the base portion. Means are provided in the base portion to allow the hold open apparatus to be fastened to a movable external member.

A further object of the invention is to provide a hold open apparatus which utilizes a compression spring to elevate an elongated rod member to a position wherein it will hold a movable external member in a predetermined position.

Another object of the invention resides in the provision of a hold open apparatus wherein the length of the rod member which holds the movable external member in a predetermined position is selectively adjustable to accomodate varying distances between the movable external member to which the apparatus is fastened and the stationary member which the free end of the rod engages when elevated.

A further object is to provide a hold open apparatus which is formed of a material which is substantially chemically inactive when exposed to gasoline.

Yet another object of the invention is to provide a hold open device having a base portion or bracket which can be easily affixed to the movable member, either by securing thereto as by fastening means, or by means of a spring-like clip arrangement.

It is yet another object of the invention to provide an apparatus as set forth in the preceding object which can be provided with a base or a supporting member having integrally formed therein a fastening or securing means by which the base can be clipped or otherwise attached and a resilient section which cooperates with a rod or the like to position the latter in operative position whenever the movable member is moved to its open position.

It is still yet another object of the invention to provide a apparatus which is embodied basically of two members formed and interconnected so as to provide both a hold down base, a rod for locking a movable member in position, and resilient means for moving the rod to operative position.

An additional object of the invention is to provide a hold open apparatus comprising a base plate having a curved clip-like end formed thereon extending substantially parallel to the base thereof and also having an upwardly extending section formed integrally therewith which provides with the base section a rod receiving section wherein the rod can be rotatably associated with the base plate. In addition there is provided a resilient leg on the base plate which cooperates with the rod to urge the rod to active position whenever the movable member is moved to the open position. According to the invention there is provided a single plate-like base embodying a fastening means integrally therewith, a rod receiving opening in which the rod is rotatably held and a resilient spring-like member for urging the rod into active position which are formed integrally with the single plate-like base member.

Other objects and details of the invention will become apparent from the following description, when read in conjunction with the accompanying drawings.

BRIEF DESCRIPTION OF THE DRAWINGS

FIG. 1 depicts a perspective view of a hold open apparatus according to the invention, in an operative position holding a license plate frame in a substantially horizontal position, and having a substantially rectangular enclosure with a spring-biased rod pivotally mounted therein.

FIG. 2 is an elevational view of the side of the hold open apparatus.

FIG. 3 is an elevational view of the top of the hold open apparatus.

FIG. 4 is an elevational view of the rear of the hold open apparatus.

FIG. 5 is an elevational view of the front of the hold open apparatus.

FIG. 6 is an elevational view of the bottom of the substantially rectangular base portion of the enclosure showing the apertures for attaching the hold open device to a movable external member.

FIG. 7 depicts a sectioned view of the adjustability feature of the hold open device taken along line 7—7 in FIG. 2.

FIG. 8 depicts a sectioned elevational view of the substantially rectangular enclosure member and the elongated rod member showing the rod pivotally mounted within the enclosure on a pin member, and biased by a compression spring.

FIG. 9 depicts a sectioned view of an alternate form of an adjustment means.

FIG. 10 is a top plan view of a second form of the hold open apparatus with the rod in its hold open position and with the apparatus slightly tilted.

FIG. 11 is a likewise slightly tilted bottom plan view of the apparatus of FIG. 10.

FIG. 12 is a right side elevation of the apparatus of FIG. 10.

FIG. 13 is a left side elevation of the apparatus of FIG. 10.

FIG. 14 is a front view of the apparatus of FIG. 10 taken along line 14—14 of FIG. 10 and showing the hold open rod in a retracted position.

FIG. 15 is a fragmentary perspective view showing the apparatus of FIG. 10 attached to the license plate or the like.

DETAILED DESCRIPTION OF THE PREFERRED EMBODIMENTS

With reference to FIG. 1, a first embodiment of a hold open apparatus 1 in accordance with the present invention is depicted. The hold open apparatus 1 is fabricated of material which is not chemically reactive when exposed to conventional fuels such as gasoline, diesel fuel, or aviation fuel. Such material must also be sufficiently strong to maintain strength and rigidity over long periods of time.

The hold open apparatus 1 includes, generally an enclosure member 2 comprised of a base portion 3 and upwardly-extending side walls 4, 5, and an elongated rod member 7 pivotally mounted on a pin 6 and biased by a compression spring 8.

As shown in FIG. 1, the enclosure member 2 is defined by a substantially rectangular base portion 3 and a pair of substantially vertical upwardly-extending side walls 4 and 5 extending perpendicularly from the long sides of a base portion 3. The side walls 4 and 5 are formed integrally with the base portion 3.

Disposed between, and perpendicular to, the side walls 4 and 5 is a pin 6. The pin 6 extends through the side walls 4 and 5 at a point substantially centrally located on the side walls 4 and 5 and above the central longitudinal axis of the enclosure member 2. An elongated, cylindrical rod 7 is pivotally mounted within the enclosure 2, the pin 6 extending through the first end 8 of the rod 7 substantially perpendicularly to the longitudinal axis of the rod 7. The hold open apparatus 1 is shown in FIG. 1 in an operative position holding a license plate frame 9 in a substantially horizontal position. The base portion 3 is fastened to the license plate frame 9 so that when the frame, which is biased to a normally closed position, is moved to an open position, the elongated rod 7 is biased so that the second end 10 elevates to engage a stationary member 11, thereby securing the frame 9 in spaced apart relation to the stationary member 11. The frame is returned to its normally closed position by exerting force against the biasing means of the hold open apparatus 1 to return the rod 7 to a non-elevated position substantially parallel to the base portion 3. The biasing element of the license plate frame then returns the frame to a normally closed position.

With reference to FIG. 2, the biasing member of the hold open apparatus 1 is depicted. The biasing means is comprised of a compression spring 12 having a coil 13, an elongated rod 7 engaging element 14, and a base portion 3 engaging element 15. The pin 6 extends coaxially through the coil 13 of the compression spring 12 and through the first end 8 of the rod 7. The base portion 3 engaging element 15 of the spring 12 engages the interior surface of the first end 16 of the base portion 3 forwardly of apertures 18, 19 extending through the base portion 3. The elongated rod 7 engaging element 14 of the spring 12 engages the underside of the elongated rod 7 at a point substantially coplanar to the point at which the base engaging element 15 engages the first end 16 of the base portion 3. The force exerted by the compression spring 12 biases the rod 7 in a normally elevated position. The angle of elevation of the rod 7 is determined by the distance from the first end 8 of the rod 7 to the point where the pin 6 extends through the rod 7. The closer the pin 6 to the first end 8 of the rod 7, the greater will be the angle between the base portion 3 and the rod 7. In the preferred embodiment, the pin 6 extends through the first end 8 of the rod 7 a sufficient distance from the first end 8 so that when the compression spring 12 biases the rod 7 to a normally elevated position, the first end 8 of the rod 7 engages the second end 17 of the base portion 3 so as to form an acute angle between the base portion 3 and the rod 7. The first end 8 of the rod 7 does not extend rearwardly of the second end 17 of the base portion 8, nor does it extend forwardly of the pin 6.

With reference to FIGS. 2 and 3, the hold open apparatus 1 is shown in the elevated position, the compression spring 12 biasing the rod 7 upwardly until the first end 8 of the rod 7 engages the second end 17 of the base portion 3.

FIGS. 4 and 5 show the hold open apparatus 1 in the elevated position from the back and front respectively. It is clearly seen that the elongated rod 7 engaging element 14 engages the underside of the first end 8 of the rod 7, biasing it upwardly. The figures further show how the first end 8 of the rod 7 cooperates with the base portion 3 to set the angle of elevation of the rod 7 in relation to the base portion 3.

With reference to FIG. 6, the underside of the hold open apparatus 1 is shown, disclosing the two apertures 18 and 19 through which fastening means are extended to secure the hold open apparatus 1 to a movable external member such as frame 9. Further, the engagement of the rod 7 engaging element 14 with the underside of the rod 7, and the engagement of the base portion 3 engaging element 15 with the base portion 3 is disclosed.

With reference to FIG. 7, the means for adjusting the length of the elongated rod 7 is shown. A threaded aperture 20 extends rearwardly from the second end 10 coaxially with the longitudinal axis of the rod 7. A bolt 21 is threadably received in aperture 20. The stationary member-engaging head 22 of the bolt 21 may be extended from or retracted toward the second end 10 of the rod 7 by selectively rotating the bolt 21. The length of the rod 7 can thereby be adjusted so as to hold the movable external member in the desired position.

FIG. 8 clearly shows how the elongated rod 7 is pivotally mounted on pin 6, how the rod 7 engaging element 14 of the compression spring 12 biases the rod 7 upwardly, and how the first end 8 of the elongated rod 7 engages the second end 17 of the base portion 3 to limit the upward movement imparted by the spring 12 and to form the predetermined angle between the base portion 3 and the rod 7.

The hold down apparatus may be of steel, but any other material which will not react with gasoline or other fuels can be used.

FIG. 9 shows another form of adjustment means which can be used in place of that shown in FIG. 7. In this instance the adjustment means comprises a self tapping screw 23 which is received in the aperture 24. This screw is provided with the typical head by means of which the screw can be adjusted within the aperture 24.

FIGS. 10 through 15 show a second preferred form of the invention. In this form of the invention, the hold open apparatus 25 comprises a base plate 26. The base plate at one end has a curved section 27 which forms a clip member 28 extending parallel to and beneath the upper section 29 of the base plate as indicated at 30. The clip member terminates in a lip 31 which depends downwardly therefrom and can serve to facilitate engaging a license plate, license plate holder, or the like movable device, which it is desired to retain in an open position for a temporary purpose.

The plate 26 has an upwardly extending rod receiving groove 32 which is bent upwardly from the base plate and formed integrally therewith. The groove or channel 32 is formed by opening slits 33 and 33 in the plate 26, and then by forming the rod groove by swaging or the like.

Elongated locking rod 34 has a section which is received within the rod groove as shown particularly in FIGS. 12-15. The rod 34 has an elongated upper section or leg 35 which extends upwardly and forwardly as viewed in FIG. 15 from the base plate 26. The rod has a lower section 36 (FIGS. 12 and 13), which is connected to the upper section by a curved intermediate portion 37. This lower section 36 extends through the rod groove 34 and forwardly thereof to an angularly extending end section 38. The end piece is connected to the intermediate section 37 by a curved portion 39, and the curved intermediate section is likewise connected to the main section of the rod by an intermediate section 40. As a result, as viewed in FIG. 10, the end section 38 is seen to be set off to the left with respect to the main section of the rod 34.

As also more clearly seen in FIGS. 10 and 11, the base plate 26 has a leg 41 at its right edge which extends forwardly from the rear end 42 of the base plate and forwardly over the top of the end section 38, and engages the latter section. The base plate 26 is formed of a resilient spring steel and the leg 41 is deformed in its extension forwardly and over the end piece 38. As a result, it resiliently urges the leg end piece 38, and thus the entire leg itself downwardly to the right as viewed in FIG. 10, and upwardly to the left as viewed in FIG. 11. As a result the base and its spring finger 41 tend to rotate the rod 34 to a position in which it extends upwardly from the base plate as seen in FIGS. 12 and 13.

As seen in FIG. 14 however, the rod 34 can be rotated within its curved channel 32 and moved into a position in which the upper section 35 is substantially parallel to the base plate 26. When this occurs the lower end piece 38 is moved upwardly from the base plate as shown in FIG. 14, and in so doing the resilient finger 41 is also bent upwardly. This increases the tension of the spring finger 41 if the rod 34 is released, such as by opening a door or plate on which it is mounted, the spring finger 41 will spring the rod section end 38 downwardly to the position shown in FIGS. 10-13 and move the rod end 35 upwardly to the position therein illustrated, and illustrated in dotted lines in FIG. 14. When the upper section or leg 35 is in the dotted line position shown in FIG. 14, the end section or piece 38 will be in the dotted line portion also shown in FIG. 14.

This is also shown in FIG. 15. As has been described, the base plate is formed of a resilient spring steel or the like resilient material which when extending from its normal shape will tend to return and urge any item in its way to bend or flex or rotate accordingly. As a result, as shown in FIG. 15, the clip and base plate can be clipped on to a licence plate such as 42 or a holder for a licence plate. When the latter is pivoted within its frame such as 44 to expose a filler cap, the spring leg 41 will urge the rod 34 to its effective position in which it will project forwardly and upwardly from the plate. As a result, when the plate tends to swing forwardly, urged by its spring usually associated with its support, the rod will engage the recess or other portion of the vehicle and limit the forward closing movement of the license plate. As a result, the gasoline or other fuel can be poured in without concern for the tendency of the plate to swing closed.

When it is desired to swing the plate closed after the fuel has been entered, it is simply necessary to urge the rod 34 to the left, as viewed in FIG. 15, and then release the license plate and/or frame so that it can pivot forwardly to its normal position. In this position the rod will be held against the base member, and substantially parallel to the plate.

A slot 45 is cut in the plate adjacent the end of the spring leg 41, and a portion 46 of the base is bent downwardly as viewed in FIG. 10 or to the left as viewed in FIG. 14 to form with the slot 45 a groove for the forward projecting end of the rod end section 38. This facilitates maintenance of the rod in proper position under the influence of the spring leaf 41. A pin 47 extends through the rod adjacent the forward edge of the rod groove, and facilitates maintaining the rod in proper position in the groove.

A pad or knob 48 is provided at the forward most end of the rod to provide a broader base for engagement with the vehicle proper, or surrounding section of the opening in which the license plate might be received, and provides a soft bearing point for the purpose of preventing scratching and catching.

While I have shown and described preferred forms of the invention, it will be understood that other forms and variations can be made within the scope of the invention and that accordingly the invention is to be limited only to the claims appended hereto.

We claim:

1. A hold open apparatus for permitting a movable external member which is biased in a normally-closed position adjacent a stationary external member to be held in an open position spaced apart from said stationary external member, comprising:
   a base member having means for attaching said apparatus to said movable external member;
   a rod member pivotally mounted on said base member;
   resilient means on said base member urging said rod member to automatically rotate into a position in which said rod member extends upwardly from said base member;
   said rod member being rotatably connected to said base member so that said rod member can be rotated into a position in which a substantial portion of said rod member extends substantially parallel to said base member;
   said rod member having a lower portion thereof which limits the movement of said rod member upwardly to an upper position under the influence of said resilient means;
   said lower portion of said rod member cooperating with said base member after said rod member has rotated a predetermined amount to limit the rotational movement of said rod member relative to said base member;
   said movable external member being biased in said normally-closed position adjacent said stationary external member in a fashion so that there is an axis of rotation disposed between between said moveable external member and said stationary external member;
   said rod member being constrained to move in a plane which intersects said axis of rotation disposed between said movable external member and said stationary external member in a predetermined angular relationship; and
   said resilient means automatically urging said rod member to rotate into said upper position when said movable external member is moved away from said normally-closed position adjacent said stationary external member.

2. The apparatus according to claim 1, wherein:
   said rod member has an upwardly extending leg and a lower section;
   an end portion connected to said lower section by a curvilinear intermediate section with said end portion extending perpendicularly to one side of said upper section;
   a channel formed in said base member, said rod lower section extending through said channel, said resilient means associated with said base member and urging said rod member to rotate within said channel, and said upper section extending at an acute angle with respect to said lower section, whereby when said lower section is rotated within said channel said upper section will rotate about said channel and extend outwardly therefrom and from said lower section, said resilient means normally urging said rod member to rotate to an operative position in which said upper section extends outwardly and upwardly from said base member, said rod member being rotatable to an inoperative position in which said rod member extends outwardly from said channel but substantially parallel to said base member.

3. The apparatus according to claim 2, wherein:
   said resilient means forms an extension of said base member and is integrally formed therewith.

4. The apparatus according to claim 3, wherein:
   said base member has a clip-like extension thereof extending beneath said base member and substantially parallel thereto and serving as a clip for affixing said base member and associated rod member to said movable external member.

5. A hold open apparatus according to claim 1, wherein:
   said base member comprises an enclosure defined by a base portion and spaced apart upwardly-extending side wall portions extending integrally from and substantially perpendicularly to said base portion;
   said base portion having a first end and a second end;
   said rod member is pivotally mounted within said enclosure;
   said rod member has a first end and a second end;
   said resilient means elevates said rod member from an inoperative position substantially parallel to said base portion to an operative position forming a predetermined angle with said base portion so that the extreme end of said rod member bears against said external stationary member; and
   means for attaching said base portion of said enclosure to said movable external member.

6. A hold open apparatus according to claim 5, wherein:
   said resilient means comprises a spring having a coil, a base-engaging portion, and a rod-engaging portion.

7. A hold open apparatus according to claim 6, wherein:

said spring is a compression spring.

8. A hold open apparatus according to claim 7, including:

a pin;

said pin being mounted between said upwardly-extending side wall portions substantially perpendicularly to said side wall portions;

said pin extending coaxially through said coil and through said first end of said rod member substantially perpendicularly to the longitudinal axis of said rod member and pivotally affixing said rod member to said enclosure;

said base-engaging portion of said compression spring engaging the interior surface of said first end of said base portion; and said rod-engaging portion of said compression spring engaging the underside of said first end of said rod member substantially coplanar to the point where said base-engaging portion of said spring engages said base portion.

9. A hold open apparatus according to claim 5, wherein:

said first end of said rod member is pivotally mounted within said enclosure so as to engage said base portion to form an acute angle between said base portion and said rod member when said external movable member is in said open position.

* * * * *